(12) United States Patent
Fujimura

(10) Patent No.: US 7,564,207 B2
(45) Date of Patent: Jul. 21, 2009

(54) PEAK HOLD CIRCUIT, MOTOR DRIVE CONTROL CIRCUIT HAVING THE PEAK HOLD CIRCUIT AND MOTOR APPARATUS HAVING THE MOTOR DRIVE CONTROL CIRCUIT

(75) Inventor: Takashi Fujimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 343 days.

(21) Appl. No.: 11/632,978

(22) PCT Filed: Jul. 14, 2005

(86) PCT No.: PCT/JP2005/013023

§ 371 (c)(1),
(2), (4) Date: Jan. 19, 2007

(87) PCT Pub. No.: WO2006/009059

PCT Pub. Date: Jan. 26, 2006

(65) Prior Publication Data

US 2007/0273324 A1    Nov. 29, 2007

(30) Foreign Application Priority Data

Jul. 23, 2004    (JP)    ............................. 2004-215039

(51) Int. Cl.
  *H02P 7/00*    (2006.01)
(52) U.S. Cl. .................. 318/432; 318/434; 318/400.06; 318/400.14; 359/154; 359/189; 369/112.05; 369/112.11; 369/112.15
(58) Field of Classification Search .................. 318/432, 318/434, 400.06, 400.14; 359/154, 189; 369/112.05, 112.11, 112.15
See application file for complete search history.

(56) References Cited

U.S. PATENT DOCUMENTS

| | | | | |
|---|---|---|---|---|
| 3,662,242 A | * | 5/1972 | Wacker et al. | ............... 318/573 |
| 4,453,117 A | * | 6/1984 | Elms et al. | ................... 318/778 |
| 6,038,049 A | | 3/2000 | Shimizu et al. | |
| 6,163,118 A | | 12/2000 | Chen et al. | |
| 6,366,549 B1 | | 4/2002 | Lee et al. | |
| 7,365,506 B2 | * | 4/2008 | Yamamoto et al. | .......... 318/432 |

(Continued)

FOREIGN PATENT DOCUMENTS

CN    1185685    6/1998

(Continued)

*Primary Examiner*—Lincoln Donovan
*Assistant Examiner*—Erick Glass
(74) *Attorney, Agent, or Firm*—Fish & Richardson P.C.

(57) ABSTRACT

A peak hold circuit is provided that operates stably even if a peak voltage to be held of a motor-drive-current detection voltage is minute. The peak hold circuit includes: a level shift circuit shifting the motor-drive-current detection voltage by a given voltage; a differential amplifier circuit receiving an output voltage of the level shift circuit and a voltage at an output terminal to amplify and output a difference between the voltages; an output transistor receiving at its base an output voltage of the differential amplifier circuit and outputting from its emitter charging current; a capacitor charged with the charging current to hold the voltage at the output terminal; a bias element generating a voltage substantially equal to the given voltage of the level shift circuit; and a resistance element provided between the bias element and the output terminal for controlling discharging current of the capacitor.

11 Claims, 5 Drawing Sheets

U.S. PATENT DOCUMENTS

| | | |
|---|---|---|
| 7,382,166 B1 * | 6/2008 | Ide ............................. 327/62 |
| 2006/0102476 A1 * | 5/2006 | Niwa et al. ................ 204/425 |
| 2008/0122539 A1 * | 5/2008 | Ide ............................. 330/254 |

FOREIGN PATENT DOCUMENTS

| | | |
|---|---|---|
| CN | 1257278 | 6/2000 |
| JP | 52-046417 | 4/1977 |
| JP | 04-107019 | 4/1992 |
| JP | 2000-166284 | 6/2000 |
| JP | 2002-218783 | 8/2002 |
| WO | WO2005/071827 | 8/2005 |

* cited by examiner

PEAK HOLD CIRCUIT, MOTOR DRIVE CONTROL CIRCUIT HAVING THE PEAK HOLD CIRCUIT AND MOTOR APPARATUS HAVING THE MOTOR DRIVE CONTROL CIRCUIT

TECHNICAL FIELD

The present invention relates to a peak hold circuit for controlling the rotational speed of a motor, the peak hold circuit holding a peak voltage of a motor-drive-current detection voltage indicating drive current of the motor, and relates to a motor drive control circuit having the peak hold circuit and a motor apparatus having the motor drive control circuit.

BACKGROUND ART

A motor apparatus of the aforementioned type is used for example for rotating an optical disc in an optical disc apparatus by means of such a motor as spindle motor, and known motor apparatuses are disclosed for example in Japanese Patent Application No. 2004-019043 and Japanese Patent Laying-Open No. 2002-218783 (Patent Document 1). Such a conventional motor apparatus is shown in FIG. 4. This motor apparatus 101 includes a motor 102, a motor driver 107, a drive-current-detection resistance element 108, and a motor drive control circuit 106. Motor driver 107 supplies drive current to armature coils $L_U$, $L_V$, $L_W$ of motor 102 for driving motor 102 and controlling the rotational speed. Drive-current-detection resistance element 108 through which this drive current flows accordingly generates a motor-drive-current detection voltage proportional to the drive current. Further, a motor control command unit (not shown) configured with a CPU for example receives from a rotational speed counter 104 information about the rotational speed of motor 102 and outputs a command voltage $V_{CM}$ to motor drive control circuit 106 so that motor 102 rotates at a desired rotational speed. Motor drive control circuit 106 controls, as described hereinlater, motor driver 107 using this command voltage $V_{CM}$ and the aforementioned motor-drive-current detection voltage.

Motor drive control circuit 106 is now described in detail. Command voltage $V_{CM}$ from the motor control command unit is input via a control terminal CNT to a control voltage conversion circuit 110. Control voltage conversion circuit 110 generates a voltage (rotational-speed control voltage) $V_{RC}$ proportional to a difference between command voltage $V_{CM}$ and a predetermined reference voltage $V_{REF}$, relative to a ground potential. A peak hold circuit 114 holds a peak voltage (detected peak voltage) $V_{DETP}$ of the motor-drive-current detection voltage from drive-current-detection resistance element 108. A rotational-speed control amplifier 115 compares rotational-speed control voltage $V_{RC}$ with detected peak voltage $V_{DETP}$ to amplify the difference and output the amplified one. Circuits in the subsequent stage of the above-described circuits control motor driver 107 so that detected peak voltage $V_{DETP}$ follows to be identical to rotational-speed control voltage $V_{RC}$. This peak hold circuit 114 is comprised, as shown in FIG. 5 for example, of a differential amplifier circuit 151, an NPN-type transistor 152, a capacitor 153, and a resistance element 154, and holds at an output terminal OUT the peak voltage of the motor-drive-current detection voltage at an input terminal IN.

FIG. 6 illustrates characteristics of the rotational speed of motor 102 with respect to command voltage $V_{CM}$ from the motor control command unit. Between a rotational speed of $T_0$ (e.g. 100 rpm) and a rotational speed of $T_1$ (e.g. 10000 rpm), the rotational speed is substantially linear with respect to command voltage $V_{CM}$. Therefore, $T_0$ and $T_1$ are respectively the minimum rotational speed and the maximum rotational speed that can be controlled and thus generally the rotational speed is controlled between $T_0$ and $T_1$. Here, $T_0$ is determined for example by a minimum detected peak voltage $V_{DETP}$ that can stably be held by peak hold circuit 114 and by noise immunity.

Patent Document 1: Japanese Patent Laying-Open No. 2002-218783

DISCLOSURE OF THE INVENTION

Problems to be Solved by the Invention

For the purpose of achieving higher performance of the optical disc apparatus, the maximum rotational speed of the optical disc is increased these days. In contrast, for the purpose of achieving multifunction capability, it is considered to use the optical disc apparatus at a rotational speed lower than normal ones, namely with ultra low speed rotations (e.g. 50 rpm). Regarding the peak hold circuit as described above, the motor-drive-current detection voltage is directly input to the differential amplifier circuit. Thus, in the case of ultra low speed rotations, namely a peak voltage to be held is minute, there arises a difficulty in stabilizing the operation.

The present invention is made in view of the circumstances. An object of the invention is to provide a peak hold circuit that operates stably even if a peak voltage to be held of a motor-drive-current detection voltage is minute, as well as a motor drive control circuit having the peak hold circuit to be able to control a motor at ultra low speed rotations and a motor apparatus having the motor drive control circuit.

Means for Solving the Problems

With the purpose of achieving the above-described objects, a peak hold circuit as recited in claim 1 is a peak hold circuit receiving at an input terminal a motor-drive-current detection voltage indicating drive current of a motor, shifting the motor-drive-current detection voltage by a given voltage, holding a peak voltage of the shifted voltage, and outputting the peak voltage from an output terminal. The peak hold circuit includes: a level shift circuit shifting the motor-drive-current detection voltage by the given voltage; a differential amplifier circuit amplifying a difference between an output voltage of the level shift circuit and a voltage at the output terminal to output the amplified difference; and a peak hold control circuit holding a peak voltage of the output voltage of the level shift circuit, the peak hold control circuit including an output transistor outputting from its emitter charging current according to an output voltage of the differential amplifier circuit that is input to its base, a capacitor charged by the charging current to hold the voltage at the output terminal, a bias element generating a voltage substantially equal to the given voltage by which the voltage is shifted by the level shift circuit, and a resistance element provided between the bias element and the output terminal for controlling discharging current of the capacitor.

A peak hold circuit as recited in claim 2 is the peak hold circuit according to claim 1 that further includes an integrator circuit removing a high frequency component of the motor-drive-current detection voltage, and the level shift circuit shifts a voltage output from the integrator circuit by the given voltage.

A peak hold circuit as recited in claim 3 is the peak hold circuit according to claim 1 or 2, in which the differential amplifier circuit includes a constant-current source transistor flowing constant current, and first and second differential input transistors having respective emitters commonly connected to the constant-current source transistor and respective bases receiving the output voltage of the level shift circuit and the voltage at the output terminal respectively. The peak hold circuit further includes a base current compensation circuit connected to the base of the second differential input transistor, and flowing current half in amount of the current of the constant-current source transistor for compensating for base current of the second differential input transistor.

A motor drive control apparatus as recited in claim 4 has the peak hold circuit according to any of claims 1 to 3 and controls a motor driver so that the peak voltage held by the peak hold circuit is equal to a predetermined voltage.

A motor apparatus as recited in claim 5 includes a motor, a motor driver driving the motor, a drive-current-detection resistance element flowing drive current of the motor to generate a motor-drive-current detection voltage, and the motor drive control circuit according to claim 4.

Effects of the Invention

The peak hold circuit according to the present invention includes the level shift circuit and the bias element and thus can operate stably even if a peak voltage to be held of the motor-drive-current detection voltage is minute. Further, the motor drive control circuit and the motor apparatus using the motor drive control circuit according to the present invention have this peak hold circuit and thus can control the motor at ultra low speed rotations.

DESCRIPTION OF THE REFERENCE SIGNS 1 motor apparatus, 2 motor, 6 motor drive control circuit, 7 motor driver, 8 drive-current-detection resistance element, 14 peak hold circuit, 40 integrator circuit, 50 level shift circuit, 60 differential amplifier circuit, 80 peak hold control circuit, 81 output transistor of the peak hold control circuit, 82 capacitor of the peak hold control circuit, 83 resistance element of the peak hold control circuit, 84 bias element of the peak hold control circuit, 90 base current compensation circuit, IN input terminal of the peak hold circuit, OUT output terminal of the peak hold circuit

BEST MODES FOR CARRYING OUT THE INVENTION

Figure 1:
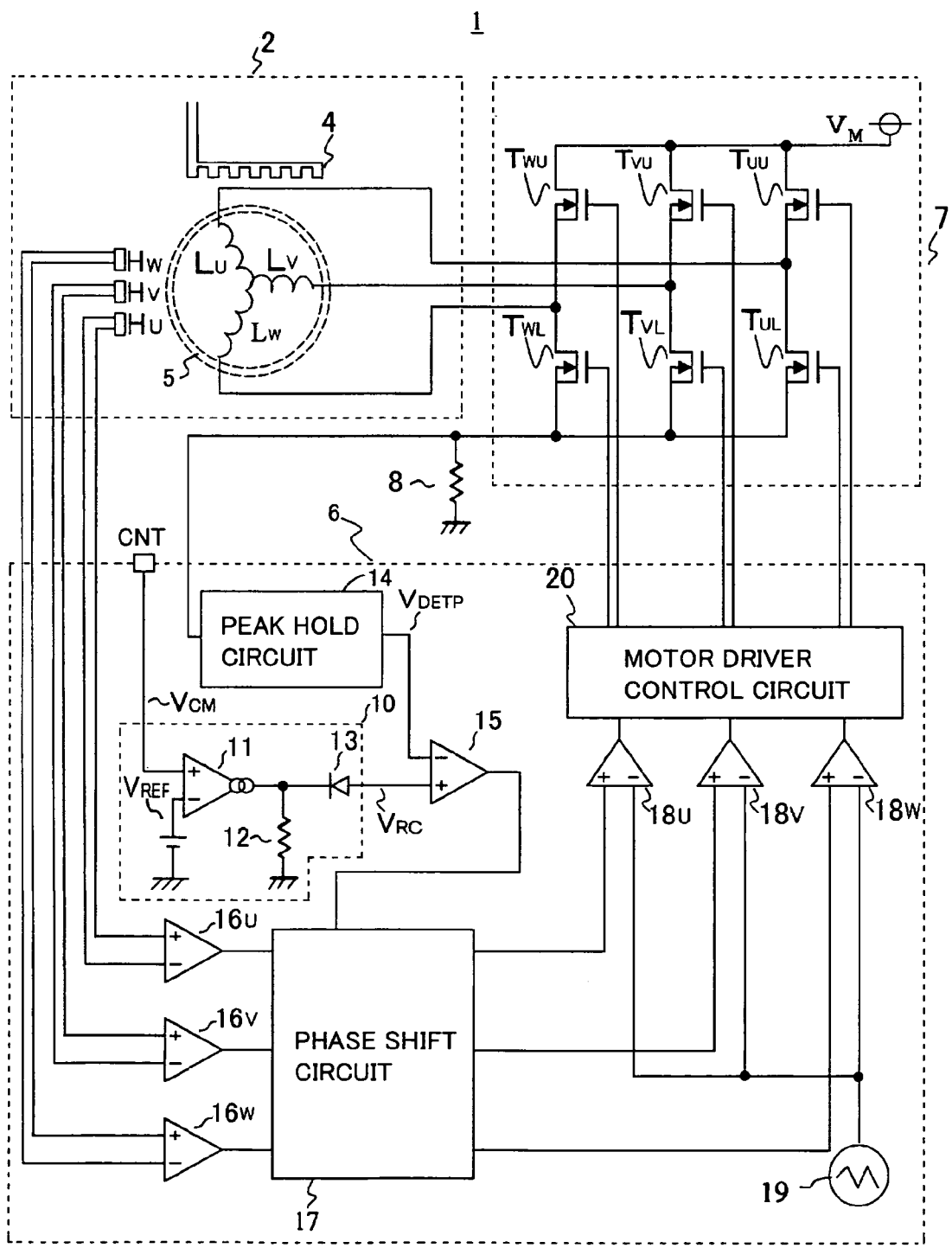
FIG. 1 is a circuit diagram of a motor apparatus according to an embodiment of the present invention.

Best modes for carrying out the present invention are hereinafter described with reference to the drawings. FIG. 1 is a circuit diagram of a motor drive control circuit as well as a motor apparatus using the motor drive control circuit according to an embodiment of the present invention. It is noted that a peak hold circuit of the embodiment of the present invention corresponds to a peak hold circuit 14 incorporated in a motor drive control circuit 6 shown in FIG. 1, and is hereinlater described in detail with reference to FIG. 2.

This motor apparatus 1 includes, as constituent blocks, a motor 2, a motor driver 7, a drive-current-detection resistance element 8, and motor drive control circuit 6. Motor driver 7 supplies drive current to armature coils $L_U$, $L_V$, $L_W$ of motor 2 for driving motor 2 and controlling the rotational speed. Drive-current-detection resistance element 8 through which this drive current flows accordingly generates a motor-drive-current detection voltage proportional to the drive current. A motor control command unit (not shown) configured with a CPU for example receives from a rotational speed counter 4, which is described hereinlater, information about the rotational speed of motor 2, and outputs to motor drive control circuit 6 a command voltage $V_{CM}$ so that motor 2 rotates at a desired rotational speed. Motor drive control circuit 6 controls, as described hereinlater, motor driver 7 using this command voltage $V_{CM}$ and the aforementioned motor-drive-current detection voltage. In the following, each block is described in detail.

Motor 2 includes a rotor 5 configured with a permanent magnet, Y-connected armature coils $L_U$, $L_V$, $L_W$ of U phase, V phase, W phase for controlling rotations of rotor 5, Hall elements $H_U$, $H_V$, $H_W$ detecting the position (phase) of rotor 5 to output respective rotational position detection signals, and rotational speed counter 4 detecting the rotational speed of motor 2 (rotor 5). The rotational position detection signals of Hall elements $H_U$, $H_V$, $H_W$ are sine waves with a certain difference relative to U phase, V phase, W phase respectively, and the phase difference between any two phases is 120°.

Motor driver 7 includes three power-supply output transistors $T_{UU}$, $T_{VU}$, $T_{WU}$ and three ground output transistors $T_{UL}$, $T_{VL}$, $T_{WL}$ that are N-type MOS transistors. The source of power-supply output transistor $T_{UU}$ and the drain of ground output transistor $T_{UL}$ are connected to U-phase coil $L_U$ of motor 2, the source of power-supply output transistor $T_{VU}$ and the drain of ground output transistor $T_{VL}$ are connected to V-phase coil $L_V$ of motor 2, and the source of power-supply output transistor $T_{WU}$ and the drain of ground output transistor $T_{WL}$ are connected to W-phase coil $L_W$ of motor 2. Further, respective drains of power-supply output transistors $T_{UU}$, $T_{VU}$, $T_{WU}$ are connected to a motor drive power supply $V_M$ and respective sources of ground output transistors $T_{UL}$, $T_{VL}$, $T_{WL}$ are grounded via drive-current-detection resistance element 8 described hereinlater. These output transistors $T_{UU}$, $T_{VU}$, $T_{WU}$, $T_{UL}$, $T_{VL}$, $T_{WL}$ have respective gates receiving a PWM output from a motor driver control circuit 20, which is described hereinlater, and are accordingly controlled. For example, when current is to be flown from U-phase coil $L_U$ to V-phase coil $L_V$ of motor 2, power-supply output transistor $T_{UU}$ and ground output transistor $T_{VL}$ receiving the PWM output from motor driver control circuit 20 are turned on. When current is to be flown from V-phase coil $L_V$ to W-phase coil $L_W$, power-supply output transistor $T_{VU}$ and ground output transistor $T_{WL}$ are turned on. Further, when current is to be flown from W-phase coil $L_W$ to U-phase coil $L_U$, power-supply output transistor $T_{WU}$ and ground output transistor $T_{UL}$ are turned on. Thus, receiving the PWM output from motor driver control circuit 20, the power-supply output transistors and the ground output transistors are switched and, the duty ratio of the PWM output is changed to change the amount of electric current for driving motor 2 so that the rotational speed of motor 2 is controlled.

In drive-current-detection resistance element 8, the drive current flows in a period during which both of a power-supply output transistor and a ground output transistor of motor driver 7 are turned on (ON-period of the PWM output) while the drive current does not flow in a period during which power-supply output transistors or ground output transistors are turned off (OFF-period of the PWM output). Further, in drive-current-detection resistance element 8, every drive current of respective armature coils $L_U$, $L_V$, $L_W$ flows and the value of the drive currents varies depending on the phase of the U phase, V phase, W phase.

A configuration of motor drive control circuit 6 is now described. Motor drive control circuit 6 includes a control terminal CNT to which command voltage $V_{CM}$ is input from the motor control command unit. A control voltage conversion circuit 10 connected to control terminal CNT generates a voltage (rotational-speed control voltage) $V_{RC}$ proportional to a difference between command voltage $V_{CM}$ and a predetermined reference voltage $V_{REF}$, relative to a forward bias voltage (Vf). Control voltage conversion circuit 10 includes a current amplifier 11 having its non-inverted input terminal receiving the command voltage of control terminal CNT and its inverted input terminal receiving predetermined reference voltage $V_{REF}$, for outputting current proportional to a difference between these voltages, a resistor 12 having one end connected to the output of current amplifier 11 and the other end grounded, for converting the current into a voltage, and a diode 13 having its cathode connected to the output of current amplifier 11 and its anode serving as an output of control voltage conversion circuit 10. With this diode 13, rotational-speed control voltage $V_{RC}$ is generated relative to the forward bias voltage (Vf). Specifically, diode 13 is configured with a transistor in diode connection.

To drive-current-detection resistance element 8, peak hold circuit 14 is connected. This peak hold circuit 14 shifts the motor-drive-current detection voltage by a given voltage to hold its peak voltage (detected peak voltage) $V_{DETP}$. To peak hold circuit 14 and control voltage conversion circuit 10 as described above, the inverted input terminal and the non-inverted input terminal of a rotational-speed control amplifier 15 are connected respectively. This rotational-speed control amplifier 15 compares detected peak voltage $V_{DETP}$ with rotational-speed control voltage $V_{RC}$ to amplify a difference therebetween and output the amplified difference to a phase shift circuit 17, which is described hereinlater.

To Hall elements $H_U$, $H_V$, $H_W$ of motor 2, Hall amplifiers $16_U$, $16_V$, $16_W$ are connected respectively. These Hall amplifiers $16_U$, $16_V$, $16_W$ amplify, at a given amplification factor, respective differential voltages of the rotational position detection signals with respect to the U phase, V phase, W phase, and output the resultant voltages. To Hall amplifiers $16_U$, $16_V$, $16_W$ and rotational-speed control amplifier 15 as described above, phase shift circuit 17 is connected. This phase shift circuit 17 shifts by a given phase (advances by 30° for example) the rotational position detection signals of the U phase, V phase, W phase that are output from Hall amplifiers $16_U$, $16_V$, $16_W$ and amplifies and outputs them with an amplification factor according to the output voltage of rotational speed control amplifier 15. It is noted that the rotational position detection signals of the U phase, V phase, W phase are shifted by the given phase in order to apply a magnetic field at the timing that rotates rotor 5 of motor 2 most efficiently.

To respective outputs of U phase, V phase, W phase of phase shift circuit 17, respective non-inverted input terminals of PWM output comparators $18_U$, $18_V$, $18_W$ are connected. These PWM output comparators $18_U$, $18_V$, $18_W$ compare the rotational position detection signals of the U phase, V phase, W phase with a triangular wave that is provided from a triangular wave generator 19 to respective non-inverted input terminals, and output respective PWM signals having a high-level on period that is the period higher in voltage than the triangular wave. To respective outputs of PWM output comparators $18_U$, $18_V$, $18_W$, motor driver control circuit 20 is connected, and this motor driver control circuit 20 generates, from the provided PWM signals, a control signal (PWM output) for controlling switching of the power-supply output transistors and the ground output transistors of motor driver 7.

An operation in the case where the rotational speed of motor 2 is changed is described. When the rotational speed of motor 2 is to be increased, command voltage $V_{CM}$ that is input from the motor control command unit to control terminal CNT increases. Accordingly, rotational-speed control voltage $V_{RC}$ is higher than detected peak voltage $V_{DETP}$. The output voltage of rotational-speed control amplifier 15 increases to increase the amplitude of the rotational position detection signals output from phase shift circuit 17. PWM output comparators $18_U$, $18_V$, $18_W$ generate the PWM signals with a duty ratio with a longer ON period, and the control signals are output via motor driver control circuit 20 to motor driver 7. Accordingly, the drive current supplied by motor driver 7 to armature coils $L_U$, $L_V$, $L_W$ of the U phase, V phase, W phase increases so that the rotational speed of motor 2 increases. The drive current is converted by drive-current-detection resistance element 8 into a voltage, and detected peak voltage $V_{DETP}$ is compared again with rotational-speed control voltage $V_{RC}$. The operational loop is repeated and, when detected peak voltage $V_{DETP}$ becomes identical to rotational-speed control voltage $V_{RC}$, a stable state is reached.

On the contrary, in the case where the rotational speed of motor 2 is to be decreased, command voltage $V_{CM}$ that is input from the motor control command unit to control terminal CNT decreases. Accordingly, rotational-speed control amplifier 15, phase shift circuit 17 and PWM output comparators $18_U$, $18_V$, $18_W$ operate in the reverse manner relative to the one for increasing the rotational speed of motor 2. Consequently, the drive current supplied by motor driver 7 to armature coils $L_U$, $L_V$, $L_W$ of the U phase, V phase, W phase decreases, which causes the rotational speed of motor 2 to decrease. The operational loop similar to the above-described one is repeated and, when detected peak voltage $V_{DETP}$ becomes identical to rotational-speed control voltage $V_{RC}$, a stable state is reached.

Figure 2:
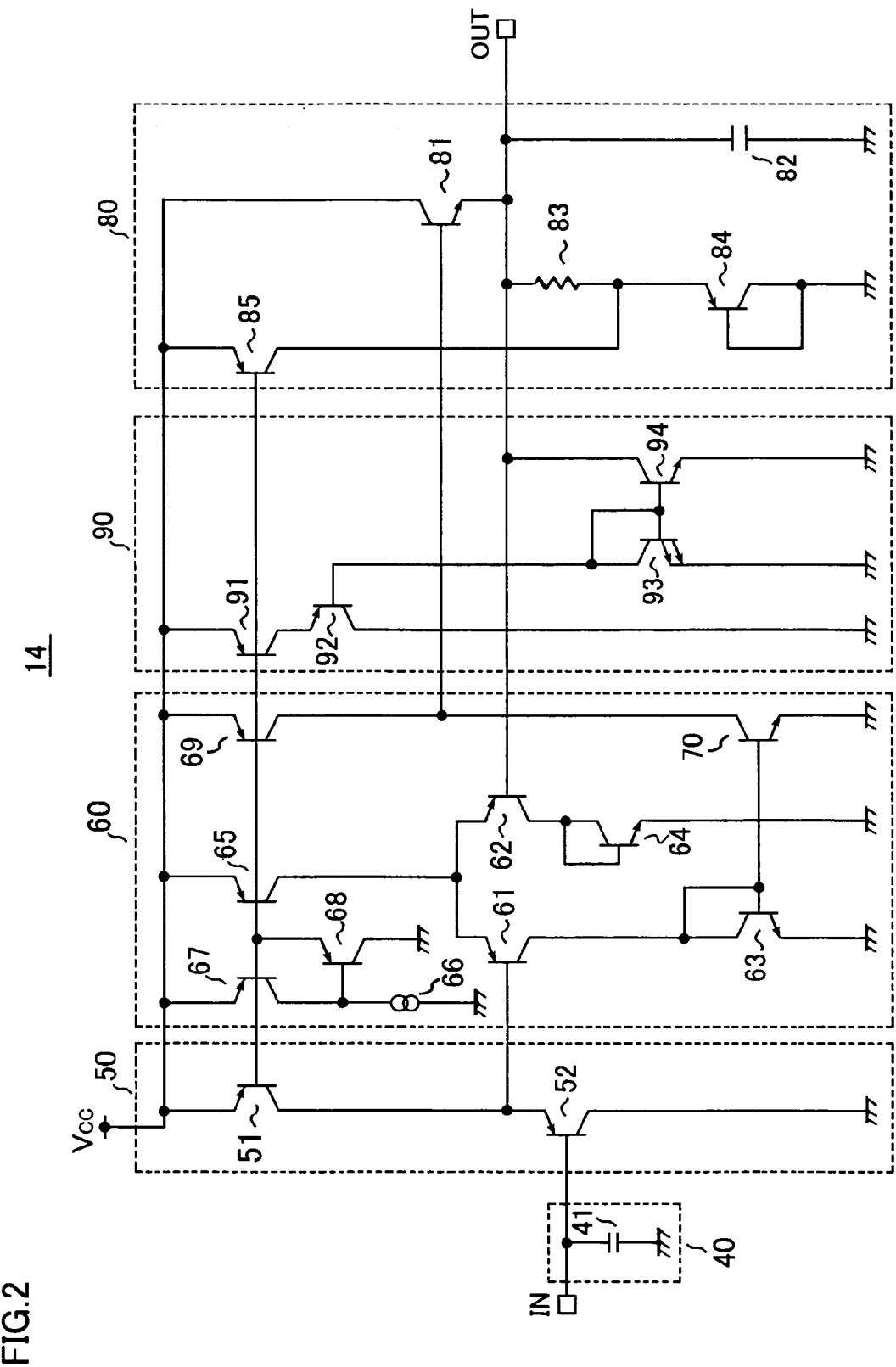
FIG. 2 is a circuit diagram of a peak hold circuit of the motor apparatus.

Next, with reference to FIG. 2, peak hold circuit 14 is described in detail. Peak hold circuit 14 includes an input terminal IN to which the motor-drive-current detection voltage is input from drive-current-detection resistance element 8, and an output terminal OUT connected to the inverted input terminal of rotational-speed control amplifier 15, and includes, between these terminals, an integrator circuit 40, a level shift circuit 50, a differential amplifier circuit 60, a peak hold control circuit 80, and a base current compensation circuit 90. In the following, a description is first given of integrator circuit 40, level shift circuit 50, differential amplifier circuit 60 and peak hold control circuit 80 and thereafter a description of base current compensation circuit 90 is given.

Input terminal IN is connected to integrator circuit 40. Integrator circuit 40 is configured with a capacitor 41 for removing a high-frequency component of an input voltage. In the subsequent stage of integrator circuit 40, level shift circuit 50 is connected, and level shift circuit 50 shifts the output voltage of integrator circuit 40 by increasing the output voltage by a given voltage. Level shift circuit 50 includes a PNP-type constant-current source transistor 51 and a PNP-type transistor 52 having its emitter connected to constant-current source 51, its base connected to the output of integrator circuit 40 and its collector grounded. The emitter of transistor 52 serves as the output of level shift circuit 50.

In the subsequent stage of level shift circuit 50, differential amplifier circuit 60 is connected. Differential amplifier circuit 60 includes one differential input transistor 61 having its base connected to the output of level shift circuit 50, the other differential input transistor 62 having its base connected to output terminal OUT, a load transistor 63 having its base and collector connected to the collector of differential input transistor 61 and its emitter grounded, a load transistor 64 having its base and collector connected to the collector of differential input transistor 62 and its emitter grounded, a PNP-type constant-current source transistor 65 connected commonly to respective emitters of differential input transistors 61 and 62, a constant-current source 66 providing a reference of a current value for constant-current source transistor 65, PNP-type transistors 67, 68 for converting the current of constant-current source 66 into the current for constant-current source transistor 65, a constant-current source transistor 69 in the output stage, and an output transistor 70 having its base connected to the base of load transistor 63, its emitter grounded and its collector connected to constant-current source transistor 69 to serve as the output of differential amplifier circuit 60. Differential amplifier circuit 60 amplifies a difference between the output voltage of level shift circuit 50 and the output at output terminal OUT to output the amplified difference to peak hold control circuit 80, specifically to output transistor 81 thereof.

In the subsequent stage of differential amplifier circuit 60, peak hold control circuit 80 is connected. Peak hold control circuit 80 includes output transistor 81 having its base connected to the output of differential amplifier circuit 60, having its collector connected to power-supply voltage $V_{CC}$ and its emitter connected to output terminal OUT, a capacitor 82 having one end connected to output terminal OUT and the other end grounded, for holding the voltage at the output terminal, a PNP-type transistor 84 in diode connection having its base and collector grounded, a resistance element 83 provided between output terminal OUT and the emitter of transistor 84, and a PNP-type constant-current source transistor 85. Diode-connected transistor 84 serves as a bias element generating a voltage that is substantially equal to the forward bias voltage (Vf) between the base and emitter of transistor 52 of level shift circuit 50. It is noted that constant-current source transistor 85 flows current equal to that of constant-current source transistor 51 of level shift circuit 50.

Next, an operation of peak hold circuit 14 is described. Integrator circuit 40 removes a high-frequency component of a voltage that is input to input terminal IN to output the resultant voltage to level shift circuit 50. Level shift circuit 50 increases the voltage by the forward bias voltage (Vf) between the base and emitter of transistor 52 to output the resultant voltage. Differential amplifier circuit 60 compares the output voltage of level shift circuit 50 with the voltage at output terminal OUT and controls transistor 81 so that the voltage at output terminal OUT becomes identical to the output voltage of level shift circuit 50. When the output voltage of level shift circuit 50 is higher than the voltage at output terminal OUT, transistor 81 charges capacitor 82 connected to output terminal OUT so as to allow the voltage at output terminal OUT to be substantially identical to the output voltage of level shift circuit 50. On the contrary, when the output voltage of level shift circuit 50 is lower than the voltage at output terminal OUT, transistor 81 is turned off Thus, the peak voltage of the output voltage of level shift circuit 50 is held.

Here, level shift circuit 50 increases the voltage that is input to input terminal IN by the forward bias voltage (Vf) so as to stably operate differential amplifier circuit 60 and peak hold control circuit 80 connected thereto. For example, if the voltage input to input terminal IN is 0 V, the output of level shift circuit 50, namely the voltage of the base of differential input transistor 61 is equal to the forward bias voltage (Vf) and the voltage of the emitter of differential input transistor 61 is 2×Vf Accordingly, the voltage necessary for operations of differential input transistor 61 and load transistor 63 can be ensured. Thus, even if the voltage input to input terminal IN is 0 V, differential amplifier circuit 60 and peak hold control circuit 80 connected thereto can stably be operated.

Similarly, transistor 84 serving as the bias element generates, as the bias voltage of the base of differential input transistor 62, namely output terminal OUT, the same voltage as the forward bias voltage (Vf) between the base and emitter of transistor 52 of level shift circuit 50. This is for stably operating peak hold circuit 14 by having the bias voltage of the base of differential input transistor 61 and the bias voltage of the base of differential input transistor 62 that are identical to each other. It is noted that, as the voltage at output terminal OUT, namely the voltage at the inverted input terminal of rotational-speed control amplifier 15 changes relative to the forward bias voltage (Vf), rotational-speed control voltage $V_{RC}$ generated by control voltage conversion circuit 10, namely the voltage at the non-inverted input terminal of rotational-speed control amplifier 15 is also changed relative to the forward bias voltage (Vf) as described above.

In the case of ultra low speed rotations where the voltage input to input terminal IN is significantly minute (peak voltage is 5 mV for example), integrator circuit 40 can alleviate influences of noise to lower the minimum controllable rotational speed. Integrator circuit 40, however, may be dispensed with if level shift circuit 50 for example can be used to sufficiently lower the minimum controllable rotational speed.

When transistor 81 is turned off, electric charge of capacitor 82 is discharged through resistance element 83 and transistor 84 in diode connection, in order to hold a peak voltage of each period since a peak voltage is input periodically at intervals according to the rotational speed. The time constant of the discharging is determined by the capacitance value of capacitor 82 and the resistance value of resistance element 83. It should be noted here that, if the time constant is too short, the peak voltage is not held and, if the time constant is too long, a higher voltage than the actual peak voltage could be continuously output. In particular, in the case of ultra low speed rotations where the voltage input to input terminal IN is significantly minute and a peak to peak interval is significantly long, the time constant has to be adjusted precisely. For this reason, the capacitance value of capacitor 82 or the resistance value of resistance element 83 is desirably adjusted by trimming.

Next, a description is given of base current compensation circuit 90 capable of further lowering the minimum controllable rotational speed in the case of ultra low speed rotations. Base current compensation circuit 90 includes a PNP-type constant-current source transistor 91, a PNP-type transistor 92 having its emitter connected to constant-current source transistor 91 and its collector grounded, an NPN-type transistor 93 having its base and collector connected to the base of transistor 92 and its emitter grounded, and an NPN-type transistor 94 having its base connected to the base of transistor 93, its collector connected to the base of differential input transistor 62 as described above, and its emitter grounded. Constant-current source transistor 91 supplies constant current equal to that of constant-current source transistor 65. Transistors 93 and 94 constitute a current mirror circuit and transistor 93 is twice in size relative to transistor 94. Accordingly, through transistor 93, the base current of constant-current source transistor 91, namely current corresponding to the base current of constant-current source transistor 65 flows while current half in amount of the base current flows through transistor 94.

When the voltage at output terminal OUT becomes substantially identical to the output voltage of level shift circuit 50 to accordingly reach a stable state, respective base voltages of differential input transistors 61 and 62 are identical to each other and the current flowing through differential input transistors 61 and 62 each is half in amount of the current of constant-current source transistor 65. Transistor 94 of base current compensation circuit 90 absorbs (compensates for) the base current of differential input transistor 62 at this time. Thus, the base current of differential input transistor 62 is prevented from flowing into capacitor 82 and resistance element 83 for example, thereby preventing variations of the voltage at output terminal OUT. In particular, in the case of ultra low speed rotations, the voltage at output terminal OUT is considerably minute and accordingly the minimum rotational speed that can be controlled by base current compensation circuit 90 can further be lowered.

As described above, peak hold circuit 14 can operate stably even if the peak voltage to be held of the motor-drive-current detection voltage that is input to input terminal IN is minute. Further, motor drive control circuit 6 having peak hold circuit 14 as well as motor apparatus 1 having this motor drive control circuit can control motor 2 at ultra low speed rotations.

First Modification

As discussed above, in peak hold control circuit 80, transistor 84 serving as the bias element generates, as a bias voltage of output terminal OUT, a voltage equal to the forward bias voltage (Vf) between the base and emitter of transistor 52 in level shift circuit 50. Transistor 84 allows the bias voltage of the base of differential input transistor 61 to be identical to the bias voltage of the base of differential input transistor 62 to stably operate peak hold circuit 14.

However, if any variations in the manufacturing process cause the forward bias voltage between the base and emitter of transistor 84 to be considerably different from the forward bias voltage between the base and emitter of transistor 52, transistor 84 could not discharge electric charge of capacitor 82 via resistance element 83. In such a case, peak hold control circuit 80 cannot output an accurate voltage from output terminal OUT.

Figure 3:
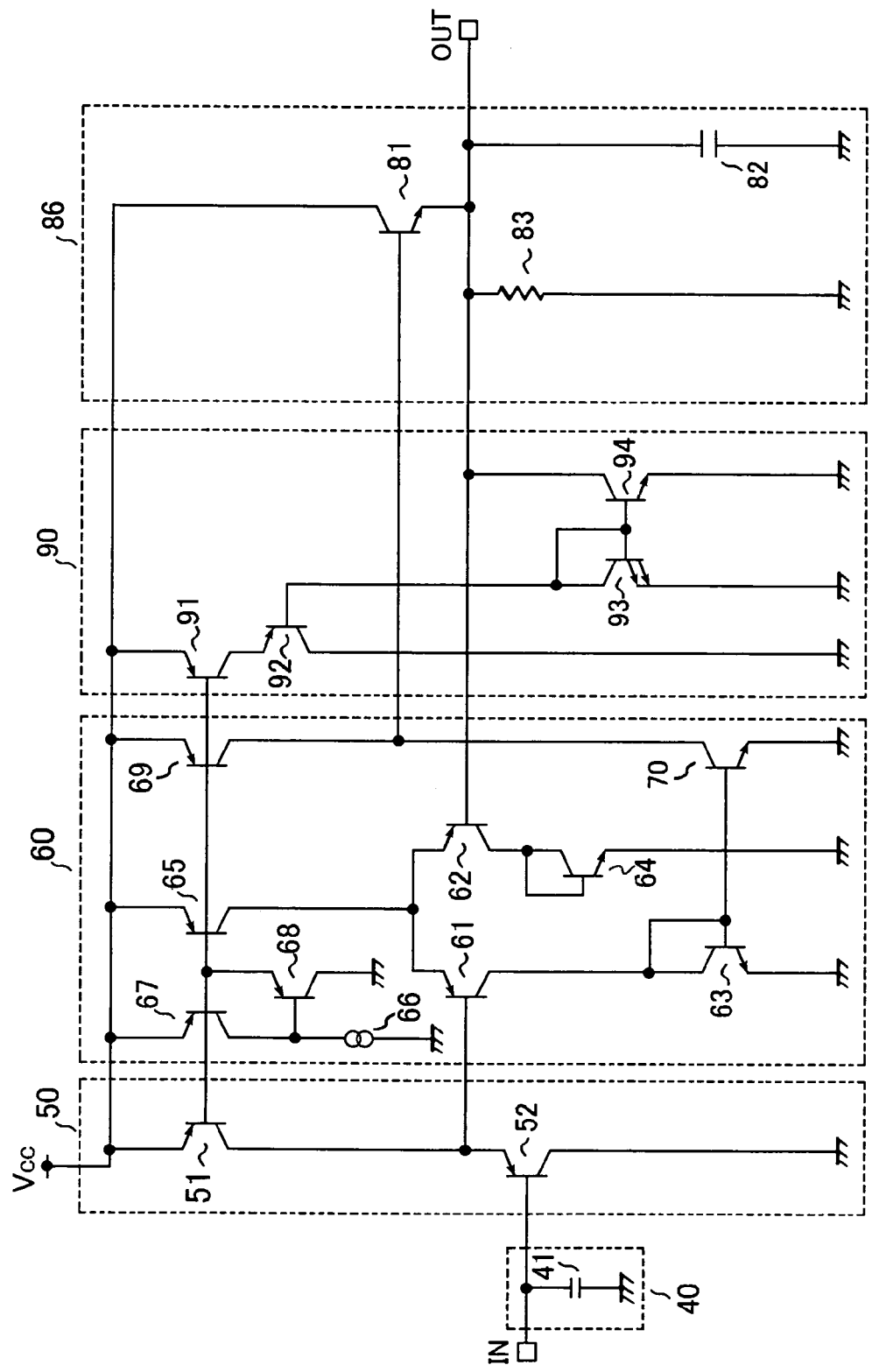
FIG. 3 is a circuit diagram of a peak hold circuit according to a first modification of the embodiment of the present invention.
Figure 4:
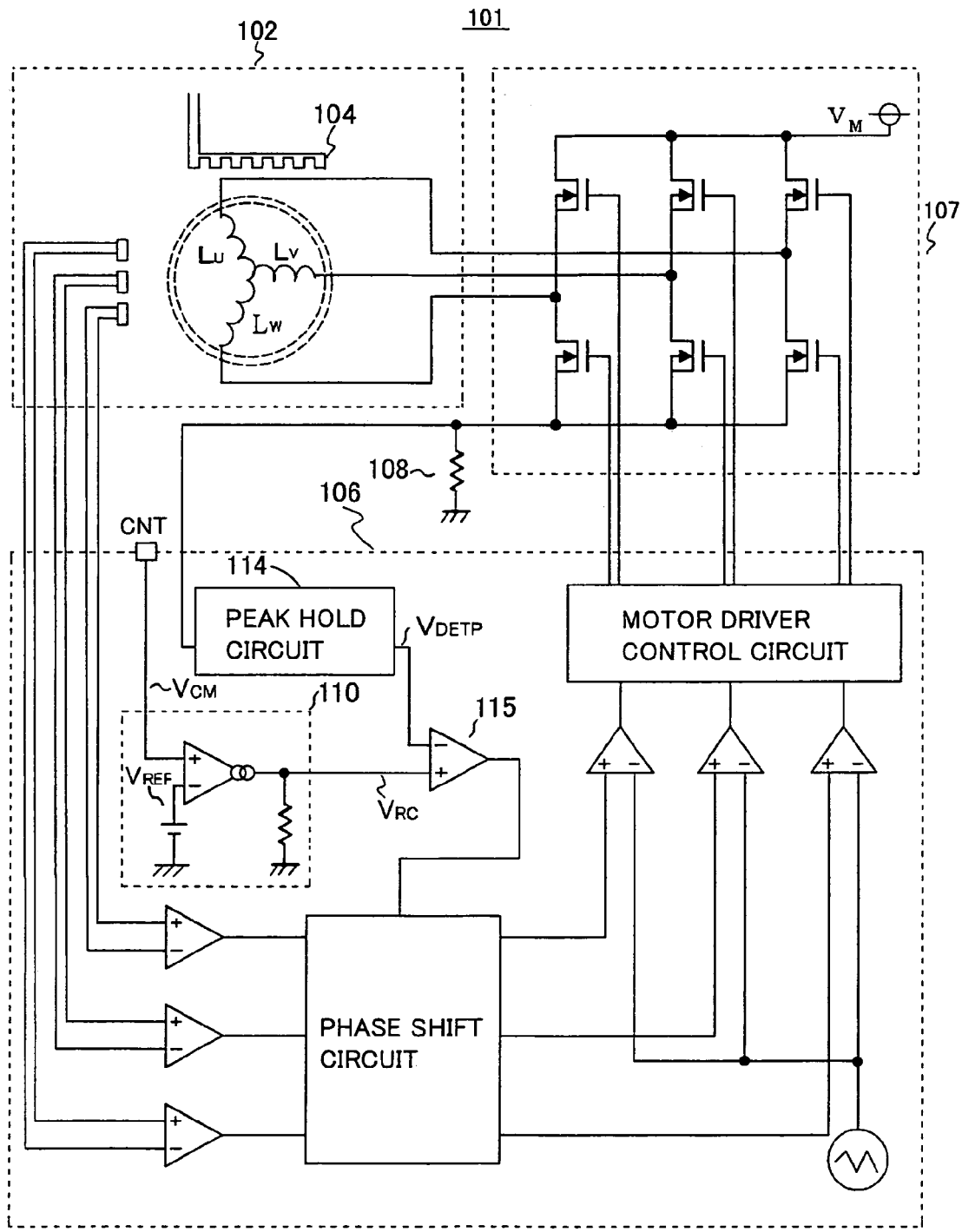
FIG. 4 is a circuit diagram of a conventional motor apparatus.
Figure 5:
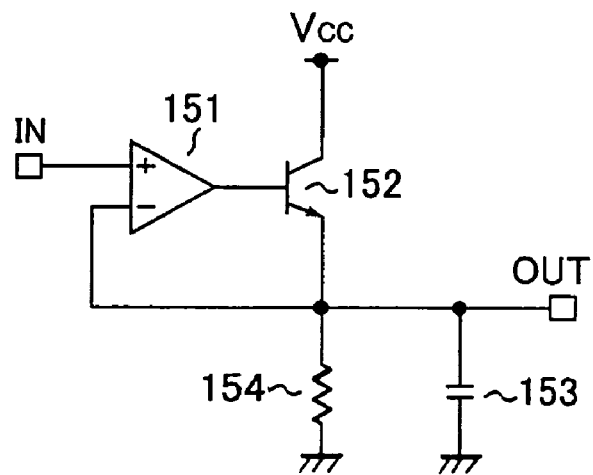
FIG. 5 is a circuit diagram of a peak hold circuit of the conventional motor apparatus.
Figure 6:
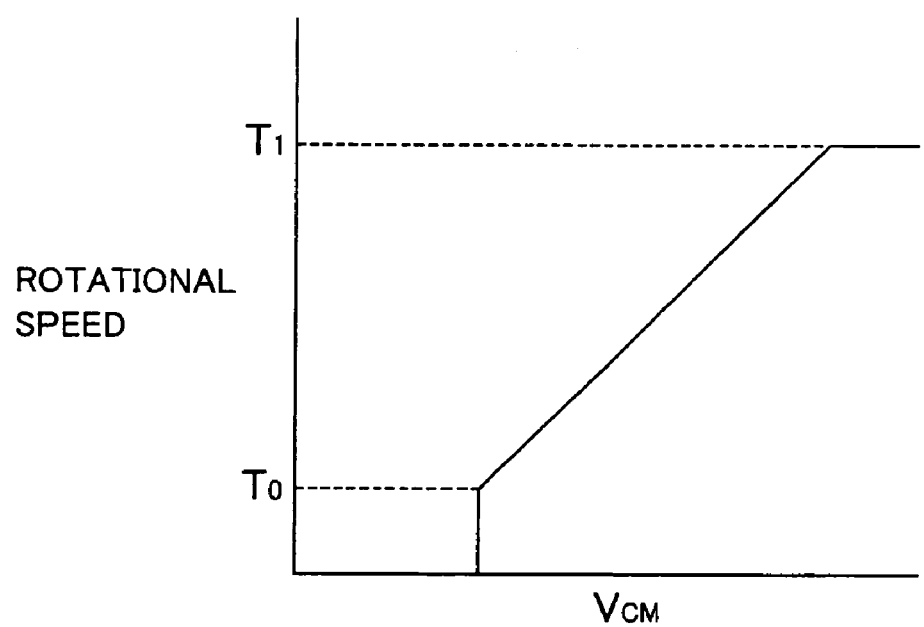
FIG. 6 a plot illustrating characteristics of the rotational speed of a motor with respect to a command voltage $V_{CM}$.

Then, in the case where variations occur to a large degree in the manufacturing process, peak hold control circuit 80 may be replaced with a peak hold control circuit 86 as shown in FIG. 3. Peak hold control circuit 86 differs from peak hold control circuit 80 shown in FIG. 2 in that the former does not include transistors 84 and 85. In peak hold control circuit 86, when transistor 81 is turned off, electric charge of capacitor 82 is surely discharged via resistance element 83. Thus, peak hold control circuit 86 can output an accurate voltage from output terminal OUT regardless of variations in the manufacturing process. It is noted that, since the voltage at output terminal OUT varies relative to the ground potential, rotational-speed control voltage $V_{RC}$ that is input to the non-inverted input terminal of rotational-speed control amplifier 15 has to be changed as well relative to the ground potential. Therefore, control voltage conversion circuit 10 shown in FIG. 1 is configured without diode 13.

Second Modification

In the case where variations occur to a large degree, the possibility that transistor 84 cannot discharge electric charge of capacitor 82 can be reduced.

In peak hold circuit 80 shown in FIG. 2, constant-current source transistor 85 is adapted to flow current equal to that of constant-current source transistor 51 of level shift circuit 50. Therefore, in transistor 84, current equal to that of transistor 52 flows. Accordingly, any variations in the manufacturing process are likely to cause a voltage difference between the forward bias voltage between the base and emitter of transistor 84 and the forward bias voltage between the base and emitter of transistor 52.

Then, constant-current source transistor 85 supplying current to transistor 84 is reduced in size with respect to constant-current source transistor 84. Accordingly, in transistor 84, current of a smaller amount than that of transistor 52 flows. Thus, any voltage difference between the forward bias voltage between the base and emitter of transistor 84 and the forward bias voltage between the base and emitter of transistor 52 is reduced. In this way, peak hold control circuit 80 can stably operate by reducing influences caused by variations in the manufacturing process 80.

The peak hold circuit, the motor drive control circuit and the motor apparatus of the embodiment of the present invention have been described. The present invention, however, is not limited to the embodiment and can be modified in design in various manners within the scope of claims as recited. For example, while level shift circuit 50 of peak hold circuit 14 makes an increase by the forward bias voltage (Vf), an additional transistor may be provided to increase the degree by which the shift is made. Moreover, the motor apparatus may be configured by providing drive-current-detection resistance element 8 between the power-supply output transistors and motor-drive power supply $V_M$ of motor driver 7.

What is claimed is:

1. A peak hold circuit receiving at an input terminal a motor-drive-current detection voltage indicating drive current of a motor, shifting the motor-drive-current detection voltage by a given voltage, holding a peak voltage of the shifted voltage, and outputting the peak voltage from an output terminal, said peak hold circuit comprising:
   a level shift circuit shifting the motor-drive-current detection voltage by the given voltage;
   a differential amplifier circuit amplifying a difference between an output voltage of the level shift circuit and a voltage at said output terminal to output the amplified difference; and
   a peak hold control circuit holding a peak voltage of the output voltage of the level shift circuit, said peak hold control circuit including an output transistor outputting from its emitter charging current according to an output voltage of the differential amplifier circuit that is input to its base, a capacitor charged by the charging current to hold the voltage at the output terminal, a bias element generating a voltage substantially equal to the given voltage by which the voltage is shifted by the level shift circuit, and a resistance element provided between the bias element and the output terminal for controlling discharging current of the capacitor.

2. The peak hold circuit according to claim 1, further comprising an integrator circuit removing a high frequency component of the motor-drive-current detection voltage, wherein said level shift circuit shifts a voltage output from the integrator circuit by the given voltage.

3. The peak hold circuit according to claim 1, wherein
said differential amplifier circuit includes a constant-current source transistor flowing constant current, and first and second differential input transistors having respective emitters commonly connected to the constant-current source transistor and respective bases receiving the output voltage of the level shift circuit and the voltage at said output terminal respectively, and
said peak hold circuit further comprises a base current compensation circuit connected to the base of the second differential input transistor, and flowing current half in amount of the current of said constant-current source transistor for compensating for base current of the second differential input transistor.

4. The peak hold circuit according to claim 1, wherein
said peak hold control circuit flows, to said bias element, current smaller in amount than current flowing in said level shift circuit.

5. A peak hold circuit receiving at an input terminal a motor-drive-current detection voltage indicating drive current of a motor, shifting the motor-drive-current detection voltage by a given voltage, holding a peak voltage of the shifted voltage, and outputting the peak voltage from an output terminal, said peak hold circuit comprising:
a level shift circuit shifting the motor-drive-current detection voltage by the given voltage;
a differential amplifier circuit amplifying a difference between an output voltage of the level shift circuit and a voltage at said output terminal to output the amplified difference; and
a peak hold control circuit holding a peak voltage of the output voltage of the level shift circuit, said peak hold control circuit including an output transistor outputting from its emitter charging current according to an output voltage of the differential amplifier circuit that is input to its base, a capacitor charged by the charging current to hold the voltage at the output terminal, and a resistance element controlling discharging current of the capacitor.

6. The peak hold circuit according to claim 5, further comprising an integrator circuit removing a high frequency component of the motor-drive-current detection voltage, wherein
said level shift circuit shifts a voltage output from the integrator circuit by the given voltage.

7. The peak hold circuit according to claim 5, wherein
said differential amplifier circuit includes a constant-current source transistor flowing constant current, and first and second differential input transistors having respective emitters commonly connected to the constant-current source transistor and respective bases receiving the output voltage of the level shift circuit and the voltage at said output terminal respectively, and
said peak hold circuit further comprises a base current compensation circuit connected to the base of the second differential input transistor, and flowing current half in amount of the current of said constant-current source transistor for compensating for base current of the second differential input transistor.

8. A motor drive control circuit having a peak hold circuit receiving at an input terminal a motor-drive-current detection voltage indicating drive current of a motor, shifting the motor-drive-current detection voltage by a given voltage, holding a peak voltage of the shifted voltage, and outputting the peak voltage from an output terminal, said motor drive control circuit controlling a motor driver driving the motor so that the peak voltage held by the peak hold circuit is identical to a predetermined voltage,
said peak hold circuit including:
a level shift circuit shifting the motor-drive-current detection voltage by the given voltage;
a differential amplifier circuit amplifying a difference between an output voltage of the level shift circuit and a voltage at said output terminal to output the amplified difference; and
a peak hold control circuit holding a peak voltage of the output voltage of the level shift circuit, said peak hold control circuit including an output transistor outputting from its emitter charging current according to an output voltage of the differential amplifier circuit that is input to its base, a capacitor charged with the charging current to hold the voltage at the output terminal, a bias element generating a voltage substantially equal to the given voltage by which the voltage is shifted by the level shift circuit, and a resistance element provided between the bias element and the output terminal for controlling discharging current of the capacitor.

9. A motor drive control circuit having a peak hold circuit receiving at an input terminal a motor-drive-current detection voltage indicating drive current of a motor, shifting the motor-drive-current detection voltage by a given voltage, holding a peak voltage of the shifted voltage, and outputting the peak voltage from an output terminal, said motor drive control circuit controlling a motor driver driving the motor so that the peak voltage held by the peak hold circuit is identical to a predetermined voltage,
said peak hold circuit including:
a level shift circuit shifting the motor-drive-current detection voltage by the given voltage;
a differential amplifier circuit amplifying a difference between an output voltage of the level shift circuit and a voltage at said output terminal to output the amplified difference; and
a peak hold control circuit holding a peak voltage of the output voltage of the level shift circuit, said peak hold control circuit including an output transistor outputting from its emitter charging current according to an output voltage of the differential amplifier circuit that is input to its base, a capacitor charged with the charging current to hold the voltage at the output terminal, and a resistance element controlling discharging current of the capacitor.

10. A motor apparatus comprising:
a motor;
a motor driver driving the motor;
a drive-current-detection resistance element flowing drive current of the motor to generate a motor-drive-current detection voltage; and
a motor drive control circuit, wherein
said motor drive control circuit has a peak hold circuit receiving at an input terminal the motor-drive-current detection voltage indicating the drive current of the motor, shifting the motor-drive-current detection voltage by a given voltage, holding a peak voltage of the shifted voltage, and outputting the peak voltage from an output terminal, said motor drive control circuit controls the motor driver driving the motor so that the peak voltage held by the peak hold circuit is identical to a predetermined voltage, and
said peak hold circuit includes:
a level shift circuit shifting the motor-drive-current detection voltage by the given voltage;
a differential amplifier circuit amplifying a difference between an output voltage of the level shift circuit and a voltage at said output terminal to output the amplified difference; and a peak hold control circuit holding a peak voltage of the output voltage of the level shift circuit, said peak hold control circuit including an output transistor outputting from its emitter charging current according to an output voltage of the differential amplifier circuit that is input to its base, a capacitor charged with the charging current to hold the voltage at the output terminal, a bias element generating a voltage substantially equal to the given voltage by which the voltage is shifted by the level shift circuit, and a resistance element provided between the bias element and the output terminal for controlling discharging current of the capacitor.

11. A motor apparatus comprising:

a motor;

a motor driver driving the motor;

a drive-current-detection resistance element flowing drive current of the motor to generate a motor-drive-current detection voltage; and a motor drive control circuit, wherein said motor drive control circuit has a peak hold circuit receiving at an input terminal the motor-drive-current detection voltage indicating the drive current of the motor, shifting the motor-drive-current detection voltage by a given voltage, holding a peak voltage of the shifted voltage, and outputting the peak voltage from an output terminal, said motor drive control circuit controls the motor driver driving the motor that the peak voltage held by the peak hold circuit is identical to a predetermined voltage, and said peak hold circuit includes:

a level shift circuit shifting the motor-drive-current detection voltage by the given voltage;

a differential amplifier circuit amplifying a difference between an output voltage of the level shift circuit and a voltage at said output terminal to output the amplified difference; and a peak hold control circuit holding a peak voltage of the output voltage of the level shift circuit, said peak hold control circuit including an output transistor outputting from its emitter charging current according to an output voltage of the differential amplifier circuit that is input to its base, a capacitor charged with the charging current to hold the voltage at the output terminal, and a resistance element controlling discharging current of the capacitor.

* * * * *